United States Patent Office 3,254,084
Patented May 31, 1966

3,254,084
WATER-SOLUBLE DYESTUFFS OF THE ANTHRAQUINONE SERIES
Richard Fleischhauer, Frankfurt am Main, Fechenheim, and Rolf Müller, Frankfurt am Main, Germany
No Drawing. Filed Oct. 31, 1963, Ser. No. 320,520
Claims priority, application Germany, Nov. 3, 1962, C 28,338
6 Claims. (Cl. 260—249)

This invention relates to new water-soluble dyestuffs of the anthraquinone series.

More particularly, it relates to water-soluble dyestuffs of the anthraquinone series which derive from the 1,4-diaminoanthraquinone-2-sulfonic acid and contain, via the amino group in 4-position, the radical of an acylamino-diphenylsulfone-sulfonic acid linked in m-position (related to the sulfone group), whose acyl radical contains either a substituent which may easily be split off in the form of an anion, or a C=C double linkage susceptible to addition reactions.

The dyestuffs according to the present invention correspond to the formula

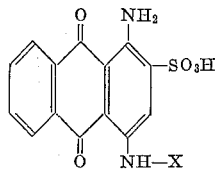

wherein X represents the radical of an acylamino-diphenylsulfone-sulfonic acid linked in m-position whose acylamino radical is contained in that phenyl nucleus of the diphenylsulfone-sulfonic acid which is not directly linked to the anthraquinone radical, said acylamino radical being a member of the group consisting of β-Chloropropionylamino
β-Bromopropionylamino
β-Phenylsulfonyl-propionylamino
β-Methylsulfonyl-propionylamino
β-Ethylsulfonyl-propionylamino
β-Phenoxy-propionylamino
Acryloylamino
β-Chloracrylolylamino
Monochloro-1,3,5-triazinylamino
Dichloro-1,3,5-triazinylamino
Monochloro-1,2,4-triazinylamino
Dichloro-1,2,4-triazinylamino
Dichloro-diazinylamino
Trichloro-diazinylamino
Chloropyridazonylamino
Chlorodiazinecarbonamide
Chlorobenzo-1,3-diazolcarbonamide
Chlorobenzo-1,3-oxazolcarbonamide
Chlorobenzo-1,3-thiazol sulfonamide Such dyestuffs may be prepared according to known methods, for example by acylating the condensation products obtained from 1-amino-4-bromanthraquinone-2-sulfonic acid and suitable diaminodiphenylsulfone-sulfonic acids with the corresponding acylating agents. As acylating agents are suited the anhydrides and especially the halides of the carbon acids or chlorazine and chlorazone derivatives bearing at least 2 chlorine atoms.

As acylating agents may be mentioned for example:
β-chloropropionyl chloride, β-bromopropionyl chloride, β-phenylsulfonyl-propionyl chloride, β-methylsulfonyl-propionyl chloride, β-ethylsulfonyl-propionyl chloride, β-phenoxy-propionyl chloride, acryloyl chloride, β-chloracryloyl chloride, chlorazine- and chlorazol-carboxylic acid chlorides, trichloro-1,3,5- or -1,2,4-triazines, especially cyanuric chloride, dichloro-triazines, trichloro-pyridazines, trichloro-pyrimidines and trichloro-pyrazines, tetrachloro-pyridazine, tetrachloro-pyrimidine, tetrachloro-pyrazine and dichloro-pyridazones.

These acyl radicals may act as so-called reactive radicals because of the substituents contained therein being capable of easily splitting off in the form of an anion, or because of the C=C double linkage susceptible to addition reactions, thus imparting to the final dyestuffs the character of reactive dyestuffs.

In the manufacture of the acylated dyestuffs according to the present invention they may be salted out of the resultant aqueous solutions by means of sodium and potassium chloride. They represent, after their separation and drying, deep dark blue powders.

They yield on cotton or regenerated cellulose (spun rayon), when dyed or printed according to a process customary for reactive dyestuffs, deep vivid dyeings or prints which, after rinsing and soaping, possess a very good wet fastness and a very good fastness to light.

Aside from their suitability as reactive dyestuffs, they may be used for the dyeing of animal fibers, such as wool and silk, furthermore polyamide fibers, leather and paper, whereby also vivid fast dyeings are obtained.

For a better understanding of the nature and objects of this invention, reference should be made to the accompanying examples which are of an illustrative rather than a limiting nature. Unless otherwise stated, all parts specified are parts by weight and all percentages given are percentages by weight; temperatures given are in degrees centigrade.

*Example 1*

72 parts of the initial dyestuffs obtained by condensation of one mol 3,3'-diamino-4-methyl-1,1'-diphenylsulfone-5-sulfonic acid and one mol 1-amino-4-bromanthraquinone-2-sulfonic acid are dissolved in about 1000 parts of water to give a neutral solution, then 30 parts by volume 4 N sodium acetate solution and 30 parts β-phenylsulfonyl-propionic acid chloride are added, and the mixture is stirred for 12 hours at 5–15°, whereby the reaction mixture is kept at a pH of 5–6 by means of 4 N sodium hydroxide solution until a sample is no longer diazotizable. Then the mixture is heated up to 50° and filtered through kieselguhr. The resultant product is salted out by means of sodium chloride separated by suction filtration and dried in the vacuum at about 45°.

Yield: 95 parts of a dark blue water-soluble dyestuff powder. When printed on cotton in the presence of sodium carbonate, urea and alginate thickening, after drying and subsequently steaming, the dyestuff yields very pure reddish blue prints which after rinsing and soaping are very fast to light and wet processing. When dyed in wool, silk or polyamide fibers, the dyestuff gives also very vivid reddish blue shades of very good fastness properties, whereby the dyebath is completely exhausted.

Preparation of the condensation product used as initial dyestuff from 3,3'-diamino-4-methyl-1,1'-diphenylsulfone-5-sulfonic acid and 1-amino-4-bromanthraquinone-2-sulfonic acid:

340 parts 3,3'-diamino-4-methyl-diphenylsulfone-5-sulfonic acids are dissolved in 3000 parts of water with the addition of sodium hydroxide solution to give a neutral solution. Thereupon 3000 parts sodium hydrogen carbonate are added. The solution is heated up to 60°, while carbon dioxide is passed through. Subsequently 40 parts copper-(I)-chloride and in the course of 3 hours 320 parts 1-amino-4-bromanthraquinone-2-sulfonic acid are introduced with stirring, and the mixture is stirred for a further 4 hours at 70°. After the addition of 200 parts by volume of a 70% sulfuric acid, the mixture is heated up to 90° and filtered. Subsequently the resultant product is salted out from the hot filtered solution and separated by suction filtration. The filter cake is washed with hot water containing 10% concentrated hydrochloric acid and sodium chloride, and is dried.

*Example 2*

70 parts of the dyestuff obtained by condensation of one mol 3,3'-diamino-4-chloro-1,1'-diphenylsulfone-5-sulfonic acid and one mol 1-amino-4-bromanthraquinone-2-sulfonic acid are dissolved with about 700 parts of water with the addition of sodium hydroxide solution to give a neutral solution, admixed with 30 parts by volume of a 4 N sodium acetate solution and 12 parts acrylic acid chloride and stirred for 12 hours at 5–15°, whereby the solution is kept neutral by means of sodium hydrogen carbonate. When a sample taken from the reaction mixture is no longer diazotizable, the latter is filtered through kieselguhr and the resultant dyestuff is salted out of the filtrate by means of sodium chloride.

The dried dyestuff yields, when printed on cotton in the presence of sodium carbonate, urea and alginate thickening, after rinsing and soaping, vivid reddish blue prints being fast to light and wet processing.

*Example 3*

72 parts of a condensation product obtained from 1 mol 1-amino-4-bromanthraquinone-2-sulfonic acid and 1 mol 3,3'-diamino-4-methyl-1,1'-diphenylsulfone-5-sulfonic acid are dissolved in about 1000 parts of water with the addition of sodium hydroxide solution to give a neutral solution and stirred at about 25–30° with a solution of 50 parts of the reaction product obtained from cyanuric chloride and 1-β-chloropropionylamino-3-aminobenzene-4-sulfonic acid in the molar ratio 1:1 until such time as a sample taken from the reaction mixture is no longer diazotizable. Then the mixture is heated up to about 60° and filtered. The resultant dyestuff is salted out of the filtrate by means of potassium chloride.

The dried dyestuff yields, when printed or dyed on cotton according to the methods customary for reactive dyestuffs, very vivid reddish blue shades.

*Example 4*

72 parts of a condensation product obtained from one mol 1-amino-4-bromanthraquinone-2-sulfonic acid and one mol 3,3'-diamino-4-methyl - 1,1' - diphenylsulfone-5-sulfonic acid are dissolved in about 1000 parts of water with the addition of sodium hydroxide solution to give a neutral solution. This solution is allowed to run at 0–5° into a suspension of 19.5 parts cyanuric chloride in 100 parts ice-water and 60 parts acetone and the liberated mineral acid is neutralized by the addition of sodium carbonate to such an extent that at the end of the reaction a pH value of 6–7 is obtained. The end of the reaction may be seen from a sample which is no longer diazotizable.

The acylated dyestuff is salted out of the reaction solution obtained. After separating and drying, it represents a dark blue water-soluble powder and, when printed on cotton in the presence of urea, alginate thickening and sodium hydrogen carbonate, it yields vivid reddish blue prints which are fast to light and wet processing.

Containing 2 other reactive chlorine atoms in the acylamino radical, the resultant dyestuff may be condensed in the molar ratio 1:1 with one of the compounds specified in the following table, whereby also dyestuffs under the invention are obtained which yield, when printed on cotton fabric according to a process customary for reactive dyestuffs, the indicated shades:

| | Shade of the final dyestuff when printed on cotton |
|---|---|
| Ammonia | Vivid reddish blue. |
| β-chlorethylamine | Do. |
| Methylamine | Do. |
| Ethanolamine | Do. |
| Diethanolamine | Do. |
| Isopropylamine | Do. |
| Cyclohexylamine | Do. |
| 2-amino-benzoic acid | Do. |
| 3-amino-benzoic acid | Do. |
| 4-amino-benzoic acid | Do. |
| Aminoacetic acid | Do. |
| β-amino-ethane-sulfonic acid | Do. |
| Methylamino-acetic acid | Do. |
| Phenylamino-acetic acid | Do. |
| 4-aminobenzene-sulfonic acid | Do. |
| 3-aminobenzene-sulfonic acid | Do. |
| α-aminopyridine | Do. |
| 3-aminophenole | Do. |
| 4-aminophenole | Do. |
| 3-amino-phenole-6-sulfonic acid | Do. |
| 3,5-diamino-benzoic acid | Do. |
| 2,4-diamino-benzoic acid | Do. |
| 2,4-diamino-toluene | Do. |
| 2,4-diaminobenzene-sulfonic acid | Do. |
| 2,5-diaminobenzene-sulfonic acid | Do. |
| 2-amino-5-naphthol-7-sulfonic acid | Do. |
| 1-amino-8-naphthol-3,6-disulfonic acid | Do. |
| Phenole-4-sulfonic acid | Do. |
| Phenole | Do. |
| Methylmercaptane | Do. |
| 1-amino-8-naphthol | Do. |
| 1-amino-5-naphthol | Do. |
| Thiophenole | Do. |
| 1-aminobenzene-3-sulfonamide | Do. |
| 1-aminobenzene-3-(β-chlorethyl) sulfonamide | Do. |
| Potassium rhodanide | Do. |
| 4-aminophenole-2-carboxylic acid | Do. |
| 4-aminophenole-6-sulfonic acid-2-carboxylic acid | Do. |

Using as acylating agent in the above example instead of the cyanuric chloride equivalent amounts of 2,4,5,6-tetrachloropyrimidine
2,5,6-trichlorotriazine-(1,3,4)
3,4,5,6-tetrachloropyridazine
2,3,5,6-tetrachloropyrazine
2,3-dichloropyrazine-5-carboxylic acid chloride or
2,3-dichloro-5,6-benzo-pyrazine-5'-carboxylic acid chloride, dyestuffs of similar valuable vivid shades and fastness properties are obtained.

*Example 5*

34.2 parts 3',4-diamino-6'-methyl-1,1'-diphenylsulfone-2-sulfonic acid are dissolved in water with the addition of the necessary amount of sodium hydroxide solution to give a neutral solution. Subsequently 50 parts sodium hydrogen carbonate are added and the solution is heated up to a temperature ranging between 60 and 70° while carbon dioxide is introduced. The mixture is admixed with one part copper-(I)-chloride and one part copper powder and at 70° with 38.2 parts 1-amino-4-bromanthraquinone-2-sulfonic acid, subsequently it is stirred for some hours at a temperature of 70 to 75°. The reaction mixture is, if necessary, subsequently diluted with water and the copper containing precipitate is separated by suction filtration. After the filtrate has been acidified with hydrochloric acid, the resultant dyestuff is precipitated by means of sodium chloride, filtered off and washed out by means of hot salt solution containing hydrochloric acid. The residue obtained is a dark water-soluble dyestuff paste.

Such an amount of this dyestuff paste as corresponds to 64.3 parts of the dry dyestuff powder, is dissolved in water with the addition of sodium hydroxide solution to give a neutral solution. At 0 to 3°, this solution is allowed to run into a suspension of 19 parts cyanuric chloride, 190 parts of acetone and 300 parts of ice-water. While the liberated mineral acid is neutralized by the addition of a sodium carbonate solution, the mixture is stirred until such time as a sample taken therefrom is no longer or only weakly diazotizable and at the end of the reaction a pH value of 6–7 is obtained. The reaction product is separated out of the resultant dyestuff solution by salting out with potassium chloride or mineral salt and filtered off. The residue is then washed with some acetone and dried in the vacuum. A dark blue water-soluble dyestuff powder is thus obtained which yields, when printed on cotton in the presence of sodium carbonate or sodium hydrogen carbonate, urea and alignate thickening according to a process customary for reactive dyestuffs, vivid reddish blue prints of a very good fastness to light and wet processing.

A dyestuff of similar tinctorial properties is obtained by condensing, as indicated in the above example, instead of the 3′,4-diamino-6′-methyl-1,1′-diphenylsulfone-2-sulfonic acid the 3′,2-diamino-6′-methyl-1,1′-diphenylsulfone-4-sulfonic acid with 1-amino-4-bromanthraquinone-2-sulfonic acid and by reacting the resultant condensation product with cyanuric chloride or with equivalent amounts of 2-(4′-sulfonylamino)-4,6-dichloro-triazine-(1,3,5).

Example 6

Such an amount of the dyestuff paste obtained according to Example 5, paragraph 1, hereinbefore as correspond to 64.3 parts of the dry dyestuff powder is dissolved in water with the addition of excess sodium hydrogen carbonate. At 5–10°, 26 parts β-phenylsulfonyl-propionyl-chloride are allowed to run into this solution and the mixture is stirred until such time as a sample taken therefrom is no longer diazotizable. After separating and drying, the reaction product represents a water-soluble dark blue dyestuff which yields, when printed on cotton or viscose rayon in the presence of sodium carbonate, urea and alginate thickening, very vivid reddish blue prints which are fast to light and wet processing.

Replacing in the above example the β-phenylsulfonyl-propionic acid chloride proposed as acylating agent by β-chloropropionic acid chloride, β-bromopropionic acid chloride or β-ethylsulfonyl-propionic acid chloride, dyestuffs of similar good tinctorial properties are obtained.

The following table enumerates further dyestuffs under the present invention which are obtained by acylation of the 4 - (amino - phenylsulfone - phenylamino) - 1 - amino-anthraquinone-2-sulfonic acids mentioned with the indicated acylating agents and which possess the shades indicated in the last column:

| Anthraquinone derivative | Acylating agent | Shade of the final dyestuff |
|---|---|---|
| 1-amino-4-(amino-phenylsulfone-phenylamino)-anthraquinone-2-sulfonic acid (with $NH_2$, $SO_3H$, $SO_2$, $CH_3$, $SO_3H$ substituents) | $Cl.\overset{O}{\underset{\|}{C}}.CH=CH_2$ | Reddish blue. |
| Same as above | $Cl.CO.CH_2.CH_2.Cl$ | Vivid reddish blue. |
| Same as above | $Cl.CO.CH=CH.Cl$ | Do. |
| Same as above | $Cl.CO.CH_2.CH_2.O-\text{C}_6\text{H}_5$ | Do. |
| Same as above | $Cl.CO.CH_2.CH_2.SO_2.CH_3$ | Do. |
| Same as above | 2-chloro-4-(carboxyphenylamino)-pyrimidine with Cl substituent | Do. |
| Same as above | 2-chloro-4-(carboxyphenylamino)-pyrimidine isomer with Cl substituent | Do. |
| Same as above | 2-chloro-4-(sulfophenylamino)-pyrimidine with Cl substituent | Do. |
| Same as above | 2,4,6-trichloropyrimidine | Do. |

| Anthraquinone derivative | Acylating agent | Shade of the final dyestuff |
|---|---|---|
| 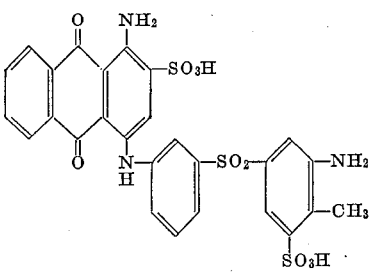 | 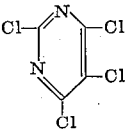 | Vivid reddish blue. |
| Same as above | 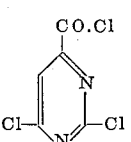 | Do. |
| Same as above | 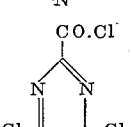 | Do. |
| Same as above | 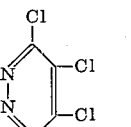 | Do. |
| Same as above | 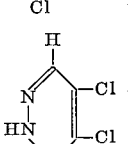 | Do. |
| Same as above | 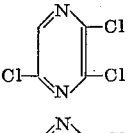 | Do. |
| Same as above | 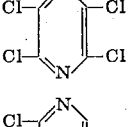 | Do. |
| Same as above | 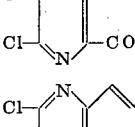 | Do. |
| Same as above | 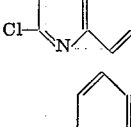 | Do. |
| Same as above | 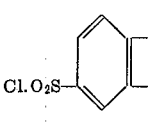 | Do. |
| Same as above | 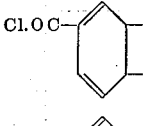 | Do. |
| Same as above | 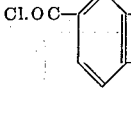 | Do. |

| Anthraquinone derivative | Acylating agent | Shade of the final dyestuff |
|---|---|---|
| 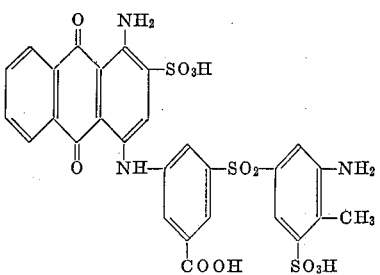 | 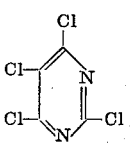 | Vivid reddish blue. |
| 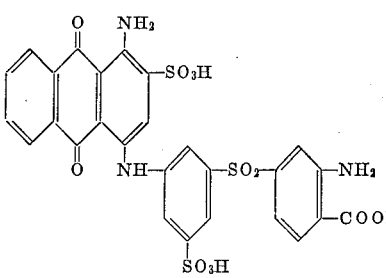 | 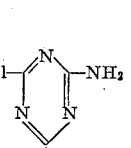 | Do. |
| 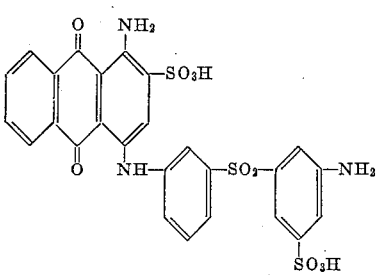 | 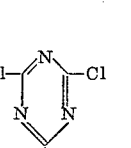 | Do. |
| 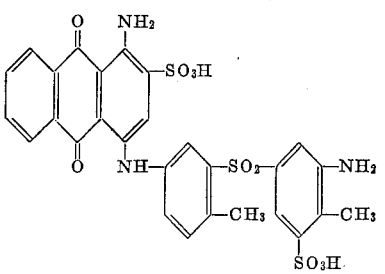 | Same as above | Do. |
| 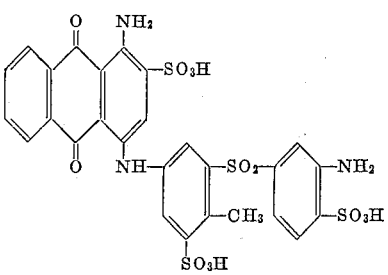 | Same as above | Do. |
| 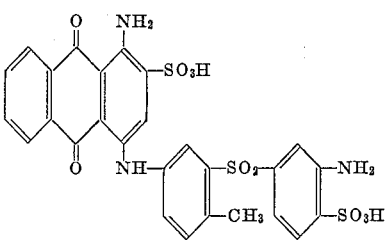 | Same as above | Do. |

| Anthraquinone derivative | Acylating agent | Shade of the final dyestuff |
|---|---|---|
| 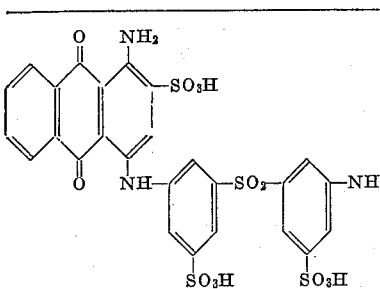 | 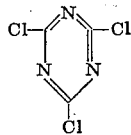 | Vivid reddish blue. |
| 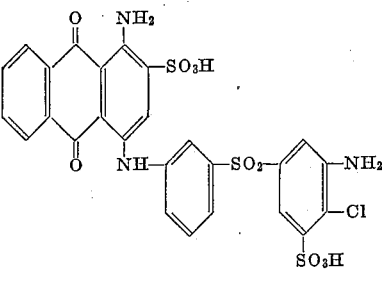 | Same as above | Do. |
| 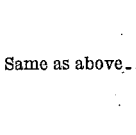 | 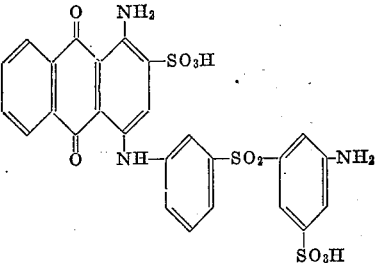 | Do. |
| Same as above | 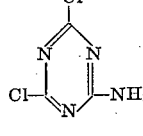 | Do. |
|  | Cl.CO.CH$_2$.CH$_2$.Br | Reddish blue. |
| 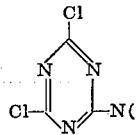 | 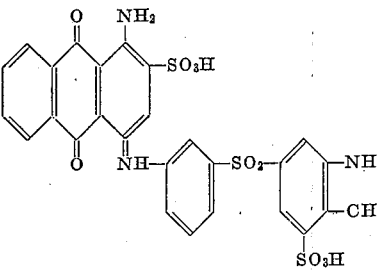 NH.CH$_2$.COOH | Vivid reddish blue. |

| Anthraquinone derivative | Acylating agent | Shade of the final dyestuff |
|---|---|---|
| 1-amino-2-sulfo-4-[(3-(3-amino-4-methyl-phenylsulfonyl)phenyl)amino]anthraquinone | 2,4-dichloro-6-(bis(2-hydroxyethyl)amino)-1,3,5-triazine | Vivid reddish blue. |
| 1-amino-2-sulfo-4-[(3-(3-amino-4-methyl-phenylsulfonyl)phenyl)amino]anthraquinone | Cl.CO.CH₂.CH₂.SO₂.CH₃ | Do. |
| 1-amino-2-sulfo-4-[(3-(3-amino-4-methyl-phenylsulfonyl)phenyl)amino]anthraquinone | 2,4-dichloro-6-(4-sulfophenylamino)-1,3,5-triazine | Do. |
| 1-amino-2-sulfo-4-[(3-(3-amino-4-methyl-phenylsulfonyl)phenyl)amino]anthraquinone | 2,4-dichloro-6-(methylthio)-1,3,5-triazine | Do. |
| 1-amino-2-sulfo-4-[(3-(2-amino-phenylsulfonyl)-4-methoxyphenyl)amino]anthraquinone sulfonic acid | 2,4,6-trichloro-1,3,5-triazine | Do. |
| 1-amino-2-sulfo-4-[(4-carboxy-4'-(3-amino-4-methyl-phenylsulfonyl)phenyl)amino]anthraquinone sulfonic acid | Same as above | Do. |

| Anthraquinone derivative | Acylating agent | Shade of the final dyestuff |
|---|---|---|
| 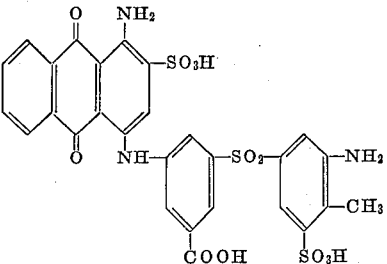 | 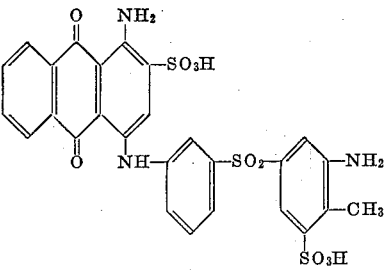 | Vivid reddish blue. |
| 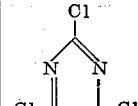 | 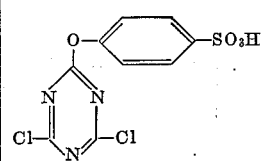 | Do. |

What we claim is:

1. Water-soluble anthraquinone dyestuffs of the formula

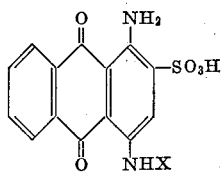

wherein X is a radical of an acylamino-1,1'-diphenyl-sulfone-sulfonic acid linked in m-position (related to the sulfone radical) whose acylamino radical is contained in that phenyl nucleus which is not directly linked to the anthraquinone radical, said acylamino radical being a member of the group consisting of β-chloropropionylamino
β-bromopropionylamino
β-phenylsulfonyl-propionylamino
β-methylsulfonyl-propionylamino
β-ethylsulfonyl-propionylamino
β-phenoxy-propionylamino
Acryloylamino
β-chloracryloylamino
Monochloro-1,3,5-triazinylamino
Dichloro-1,3,5-triazinylamino
Monochloro-1,2,4-triazinylamino
Dichloro-1,2,4-triazinylamino
Dichloro-diazinylamino
Trichloro-diazinylamino
Chloropyridazonylamino
Chlorodiazine carbonamide
Chlorobenzo-1,3-diazol carbonamide
Chlorobenzo-1,3-oxazol carbonamide
Chlorobenzo-1,3-thiazol sulfonamide.

2. 3 - [1'' - amino - 2'' - sulfo - anthraquinonyl - (4''-)-amino] - 3' - acylamino - 1,1' - diphenylsulfone - 5' - sulfonic acid, wherein acylamino has the meaning given in claim 1.

3. 3 - [1'' - amino - 2'' - sulfo - anthraquinonyl - (4''-)-amino] - 3' - acylamino - 4' - methyl - 1,1' - diphenylsulfone-5'-sulfonic acid, wherein acylamino has the meaning given in claim 1.

4. 3 - [1'' - amino - 2'' - sulfo - anthraquinonyl - (4''-)-amino] - 3 - acylamino - 6 - methyl - 1,1' - diphenylsulfone-4'-sulfonic acid, wherein acrylamino has the meaning given in claim 1.

5. 3 - [1'' - amino - 2'' - sulfo - anthraquinonyl - (4''-)-amino] - 2' - acylamino - 1,1' - diphenylsulfone - 4' - sulfonic acid, wherein acylamino has the meaning given in claim 1.

6. 3 - [1'' - amino - 2'' - sulfo - anthraquinonyl - (4''-)-amino] - 4' - acylamino - 6 - methyl - 1,1' - diphenylsulfone-2'-sulfonic acid, wherein acylamino has the meaning given in claim 1.

References Cited by the Examiner
UNITED STATES PATENTS
3,078,281   2/1963   Braun et al. _____ 260—372

JOHN D. RANDOLPH, *Acting Primary Examiner.*
WALTER A. MODANCE, *Examiner.*
J. M. FORD, *Assistant Examiner.*